June 8, 1971  SUNAO ISHIZAKA  3,583,042
FASTENER
Filed Nov. 19, 1969  2 Sheets-Sheet 2
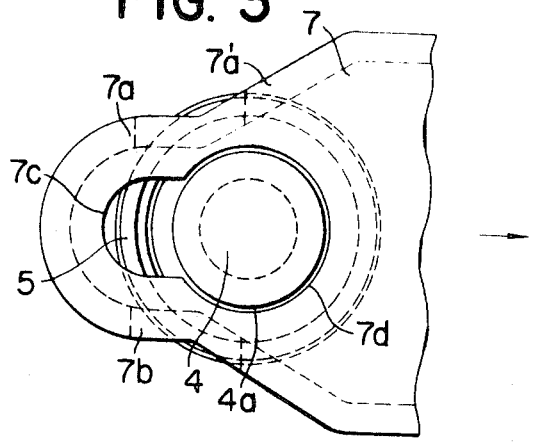
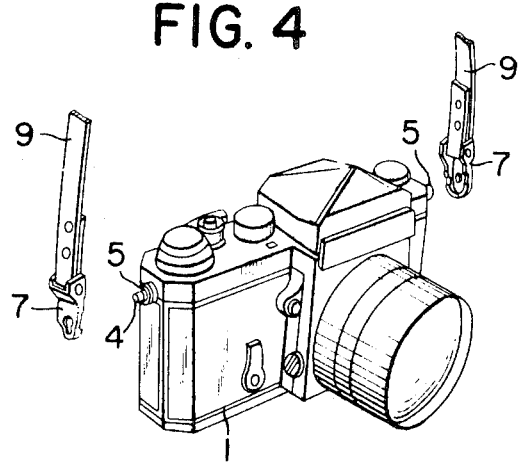
INVENTOR.
SUNAO ISHIZAKA
BY Harry G. Shapero
ATTORNEY 3,583,042
FASTENER
Sunao Ishizaka, Tokyo, Japan, assignor to
Nippon Kogaku K.K., Tokyo, Japan
Filed Nov. 19, 1969, Ser. No. 877,949
Claims priority, application Japan, Dec. 14, 1968,
43/109,395
Int. Cl. A44c 5/18
U.S. Cl. 24—265                                          1 Claim

ABSTRACT OF THE DISCLOSURE

A fastener for releasably fastening a strap to a camera or the like is provided. The strap is fastened to a connecting member having an aperture consisting of small and large diameter openings. The latter is fitted over a head of a mounting pin and the connecting member is pulled while pressing downwardly a retaining member slidably fitted over the pin so as to engage the neck of the pin with the small diameter opening, thereby securely holding the connecting member in position between the head of the pin and the retaining member by a spring.

---

The present invention relates to a fastener and more particularly means for releasably fastening a strap or the like to a camera or the like.

By the conventional fastening means of the character described above, more or less skill is required for an operator to fasten a strap to a camera and to detach it therefrom and a relatively strong force is required for this operation. Furthermore, since the structural stength of the conventional fastening means of the type described is generally not sufficient, the strap tends to be disconnected from the camera even when a relatively small external force is applied thereto.

In view of the above, the primary object of the present invention is to provide means for releasably fastening a strap or the like to a camera or the like which means is simple in construction and operation yet adequate in structural strength to withstand an external force which acts on the means.

In brief, the fastener means for releasably fastening a strap or the like to a camera or the like in accordance with the present invention is comprised of a mounting pin fixedly secured to a body of the camera or the like and having a neck portion and a flanged portion; a retaining member fixed to said mounting pin for slidable movement in the axial direction thereof and having an engaging portion, a spring for pressing said retaining member against the flanged portion of said mounting pin, and a connecting member having an aperture consisting of two intercommunicated openings, one opening being larger than said head portion of said mounting pin while the other opening being larger than said neck portion but smaller than said head portion of said mounting pin, said connecting member having an outwardly protruded portion adapted to engage with said engaging portion of said retaining member and a strap firmly fastened thereto.

To fasten the strap to the camera or the like, the large diameter opening of the connecting member is fitted over the head of the mounting pin and is pressed against the retaining member against the spring while the connecting member is moved horizontally so that the small diameter opening thereof may engage the neck portion of the mounting pin. At this position, the pressure or force pushing downwardly the retaining member as described above through the connecting member is released so that the retaining member returns to its normal position by the spring, thereby securely holding the connecting member in position. To disconnect the strap, the operation is reversed.

The above and other objects, features and advantages of the present invention will become more apparent from the following description of one illustrative embodiment thereof with reference to the accompanying drawings, in which:

FIG. 3 illustrates how the strap is fastened to the camera body; and

FIG. 4 shows the positions of the strap preliminary to its connection to the camera body.

Figure 1:
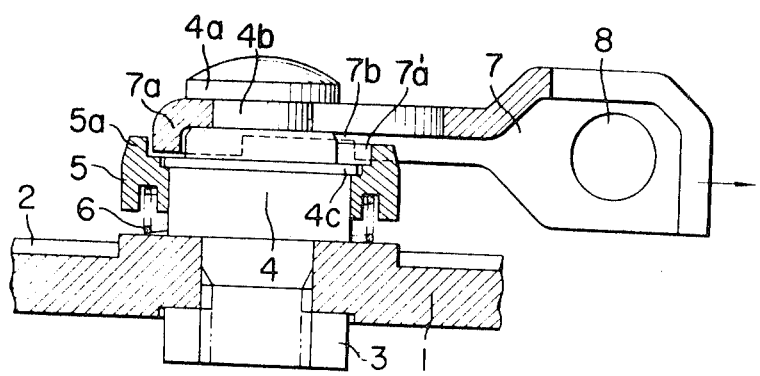
FIG. 1 is a fragmentary sectional view of one embodiment of the present invention illustrating a strap being fastened to a camera body.

Referring to the accompanying drawings, reference numeral 1 designates a camera body; 2 is a leather covering thereover; 4 is a mounting shaft or pin which is secured to the camera 1 by means of a nut 3; 5 is a releasable retainer member slidably fitted over the mounting shaft or pin 4 in the axial direction thereof and normally biased toward the flange 4c of the mounting shaft or pin 4 for abutment therewith by means of a spring 6; and 7 is a connecting member having at its one end a strap retaining shaft or pin 8 for retaining the strap 9 therearound.

Figure 2:
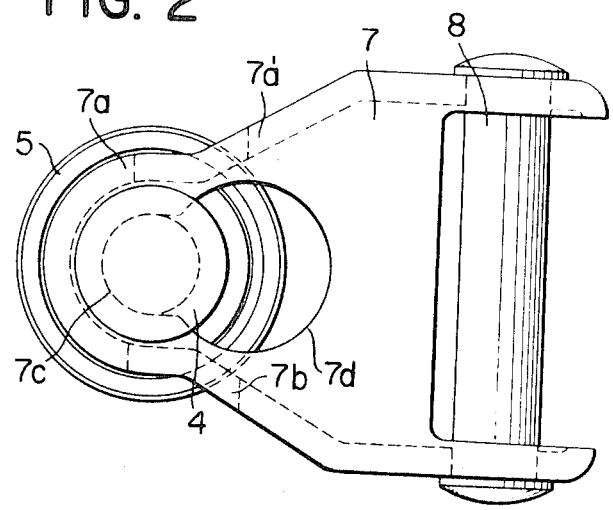
FIG. 2 is a plan view thereof.

The connecting member 7 has an opening designated by curved portions 7c and 7d and a C-shaped convex portion 7a, a sloped portion 7a' and a recess 7b. The radius of curvature of the curved portion 7c is substantially equal to or slightly larger than that of the neck 4b of the mounting shaft or pin 4, but smaller than that of the head 4a thereof. On the other hand, the radius of the C-shaped convex portion 7a is made slightly larger than that of the head 4a of the mounting shaft or pin 4. The outer periphery of the C-shaped convex portion 7a is made slightly smaller than the inner periphery of the engaging or flange portion 5a of the retaining member 5. Thus when the strap is fastened as illustrated in FIGS. 1 and 2, the engaging portion 5a will clear the connecting member 7 because of the provision of the recess 7b.

Said outwardly diverging sloped portions 7a' have the same height as that of the C-shaped convex portion 7a, and either of the semi-circular portion 7a or the sloped portions 7a' is adapted to press against the upper surface of the retaining member 5a downwardly when the strap is fastened as illustrated in FIG. 3.

Next the manner of operation will be described hereinafter. In order to fasten the strap 9 to the camera body 1, the curved line 7d of the connecting member 7 is aligned with the head 4a of the mounting shaft or pin 4 and the member 7 is pushed against the spring 6 in the direction indicated by the arrow (FIG. 1). Then, the connecting member 7 is displaced with its C-shaped convex portion 7a and the sloped portions 7a' being in contact with the upper end of the engaging portion 5a of the retaining member 5 so that the retaining member 5 may be displaced to the position shown in FIGS. 1 and 2 without being interrupted or caught. Thus, curved line 7c engages with the neck 4b and simultaneously the retaining member 5 is returned to the position indicated in FIG. 1 by the spring 6. Therefore, the above described sliding movement of the connecting member 7 toward the left is prevented by the engaging portion 5a so that the strap can be securely retained in position. To release the strap from the retainer, the retaining member 5 is pushed downwardly against the spring 6 and the connecting member 7 is displaced toward the left. Then, the strap may be simply and readily released.

From the foregoing, it will be seen that even an unskilled operator may easily and readily fasten the strap to and release it from the camera body. Furthermore, the construction is simple yet has a sufficient strength to retain securely the strap even if an external force is applied thereto, thus providing very useful advantages.

What is claimed is:

1. A device for releasably fastening a strap to a body to be suspended comprising a mounting member fixedly secured to the suspended body and having a head, a neck portion and a flanged portion; a retaining member fixed to said mounting member for slidable movement in the axial direction thereof and having an engaging portion; a spring for pressing said retaining member against said flanged portion of said mounting member; and a connecting member having an aperture consisting of two portions, one portion of said aperture being larger than said head portion of said mounting member and being defined by a first curved portion while the other portion being larger than said neck portion but smaller than said head portion of said mounting member and being defined by a second curved portion, said connecting member having a C-shaped convex portion adapted to engage with said engaging portion of said retaining member and being fastened to the strap.

References Cited
UNITED STATES PATENTS

| | | | |
|---|---|---|---|
| 2,078,010 | 4/1937 | Meepos | 24—265CDX |
| 2,723,430 | 11/1955 | Paillard | 24—265RX |
| 3,071,832 | 1/1963 | Horton | 24—265H |

DONALD A. GRIFFIN, Primary Examiner